April 1, 1969 M. S. ENDERS 3,436,564

HIGHLY SENSITIVE CIRCUIT EMPLOYING THE TEMPERATURE SENSITIVE CHARACTERISTICS OF TWO TRANSISTORS TO CONTROL A SWITCHING DEVICE

Filed July 29, 1965

INVENTOR.
MARLIN S. ENDERS

BY Earl F. Kotts
ATTORNEY

United States Patent Office 3,436,564
Patented Apr. 1, 1969

3,436,564
HIGHLY SENSITIVE CIRCUIT EMPLOYING THE TEMPERATURE SENSITIVE CHARACTERISTICS OF TWO TRANSISTORS TO CONTROL A SWITCHING DEVICE

Marlin S. Enders, 1655 Chalcedony St., Pacific Beach, Calif. 92109

Filed July 29, 1965, Ser. No. 475,652
Int. Cl. H03k 3/42, 19/14, 23/12
U.S. Cl. 307—310 8 Claims

ABSTRACT OF THE DISCLOSURE

A highly sensitive, low cost, control circuit using the temperature sensitive characteristics of transistors by connecting two transistors of opposite conduction, a first combination sensing and bias offset transistor and a second combination sensing and output transistor, with other circuit components to switch a load device in accordance with temperature sensed by the two transistors, the circuit effectivity being increased by the use of a circuit sensitizing resistor which provides rapid switching response as the combination sensing and output transistor is switched into either the conducting or non-conducting state.

The present invention relates to a sensitive, selective, wide range, solid state temperature actuated device.

This arrangement utilizes the negative temperature coefficient of an ordinary commerical transistor in a compact novel combination of elements to provide a highly efficient temperature actuated control.

It is a principal object of the present invention to provide an improved temperature actuated control device which is extremely efficient in operation while relatively low in cost.

It is another object of the present invention to provide an effective temperature actuated control device which is simple and compact, and which is constructed to avoid trouble during a long serivce life.

It is another object of the present invention to provide such a temperature actuated control device which is versatile and readily adapted to different installations.

*Circuit description*

Figure 1:
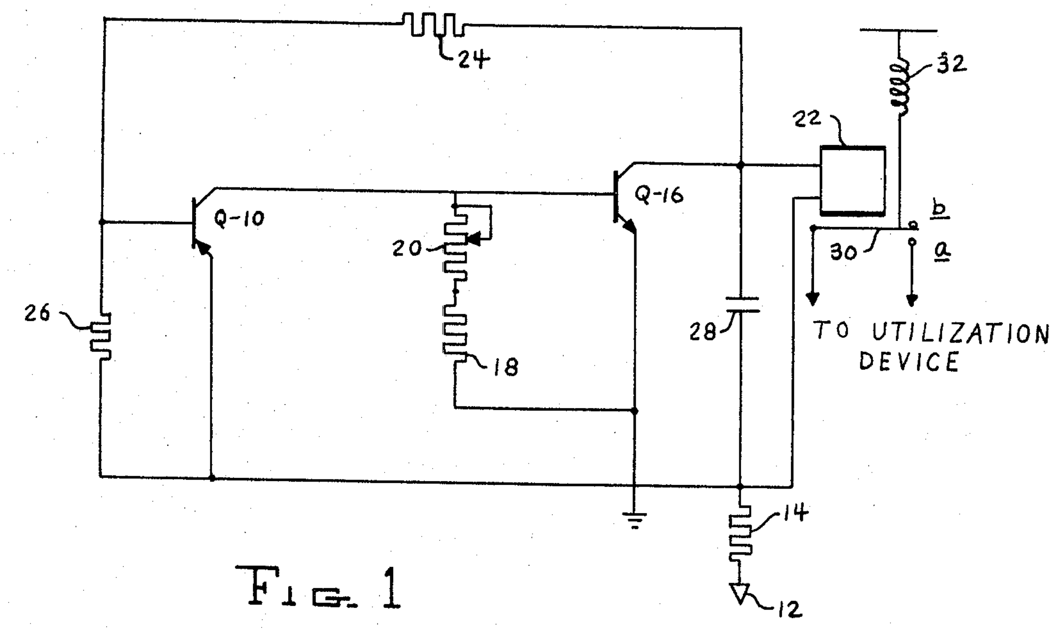
FIGURE 1 is a schematic diagram showing one embodiment of the present invention.

Referring to the drawings, a first transistor in the form of a standard commercial P-N-P transistor, such as a 2N508 for example, is shown at Q–10. The emitter lead of Q–10 is connected to a positive voltage source 12 through a circuit sensitizing ressitor 14. The collector lead of Q–10 feeds into the base lead of a second transistor Q–16 which is an N-P-N transistor, such as a 2N1306 for example. Transistor Q–10 is more temperature sensitive than transistor Q–16. However, both are temperature sensing elements in the illustrated arrangement of the present invention.

A current limiting resistor 18 is provided in series with a variable resistor 20 between ground or negative polarity and the base lead of transistor Q–16. The emitter lead of transistor Q–16 is also connected to ground or negative polarity. The collector lead of transistor Q–16 is connected to circuit sensitizing resistor 14 through relay 22. A positive feedback circuit is provided from the collector lead of transistor Q–16 through resistor 24 to the base lead of transistor Q–10. A second resistor 26 is provided between the base lead of transistor Q–10 and circuit sensitizing resistor 14 to provide, in effect, a voltage dividing network including resistors 24 and 26.

A capacitor 28 is placed across the relay 22 to filter out oscillations which may occur due to the positive feedback loop. The armature 30 of relay 22 is normally biased to position *b* by spring 32 to close the circuit to the utilization device. The relay is operable to move the armature to position *a* under conditions which will be described hereinafter.

Figures 2, 3:
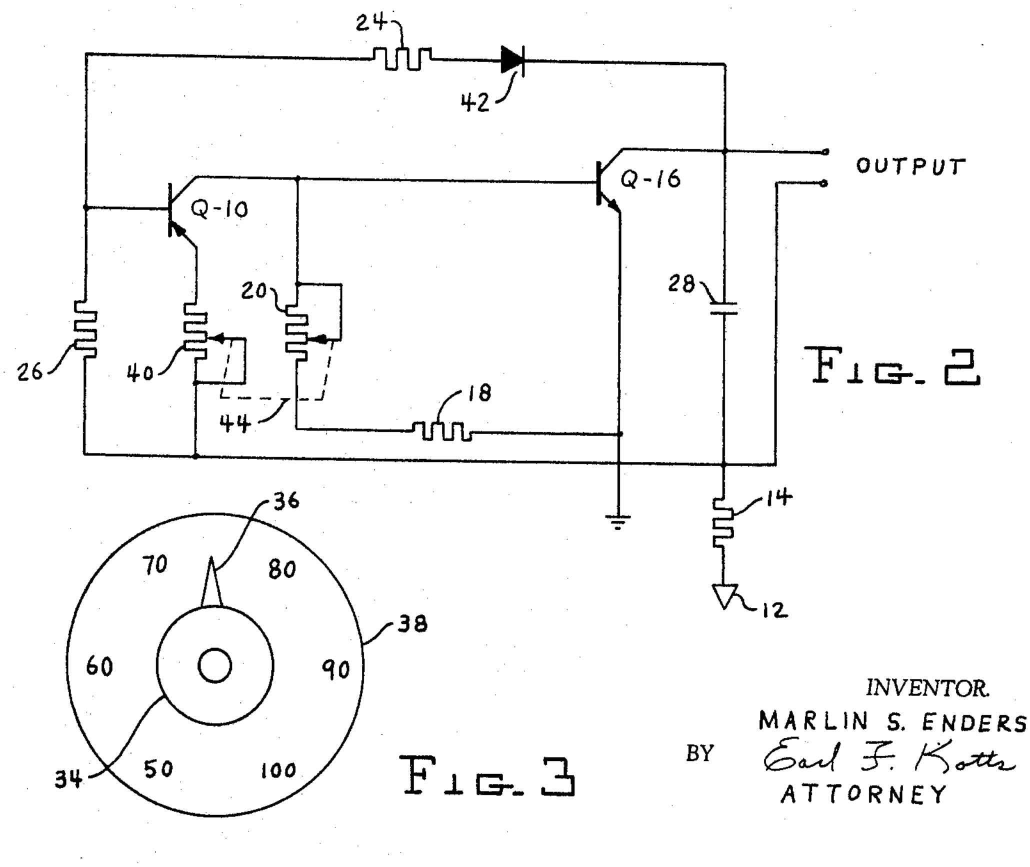
FIGURE 2 is a schematic diagram showing a second emobdiment of the present invention.
FIGURE 3 is a front elevation of the temperature range dial used with the present invention.

The variable resistor 20 has a dial knob 34 and pointer 36 connected to its shaft as shown in FIGURE 3. The pointer 36 can be turned to the desired operating temperature shown on dial card 38. Higher temperature settings are accomplished by turning the pointer clockwise.

*General operation*

The operation of the device will be discussed in relation with a heating plant, although it is to be understood that this device may be used in many other applications.

Assume that the variable resistor 20 is adjusted toward the low resistance end (clockwise direction of dial knob 34 in FIGURE 3) extending a more negative voltage to the base lead of transistor Q–16. This biases transistors Q–16 to cut-off. In this condition, with a steady ambient temperature, a positive voltage of twelve volts from the power source 12 exists at the base lead and emitter lead of transistor Q–10, and the collector lead of transistor Q–16. Current drain from the power source 12 in this condition is so small that virtually no voltage drop exists across circuit sensitivity resistor 14.

Now assume that a very small temperature increase takes place at both transistors Q–10 and Q–16. Transistor Q–10, being more temperature sensitive than transistor Q–16, will be affected first. The $I_{CBO}$ resulting from the small temperature increase will cause a small current to flow from ground through limiting resistor 18, variable resistor 20, and the emitter-collector circuit of transistor Q–10. This causes a less negative voltage at the base lead of transistor Q–16, and transistor Q–16 will start to conduct. The collector of transistor Q–16 will become less positive, and a small current will flow through feedback resistor 24 and voltage dividing resistor 26, making the base lead of transistor Q–10 less positive. Transistor Q–10 will now conduct more, extending a still less negative voltage to the base lead of transistor Q–16. Transistor Q–16 is driven into a higher state of conduction from the less negative bias at the base lead and also from the $I_{CBO}$ due to the same small temperature increase that started transistor Q–10 into conduction. This chain of events continues until transistor Q–16 is in full conduction. Relay 22 is now actuated and relay armature is moved to position *a* thus breaking the circuit to the utilization device.

Although this action takes place in a very short period of time, some oscillations occur due to the positive feedback through resistor 24 to the base lead of transistor Q–10. These oscillations are filtered out by capacitor 28.

While the device cycles into conduction, a voltage drop develops across circuit sensitizing resistor 14. This voltage drop is normally about 20%, sufficient voltage being retained to actuate the relay. The voltage drop in this instance is approximately 2 to 2.5 volts. Assume that the drop is 2 volts. The voltage at the bottom of relay 22, resistor 26, and the emitter of transistor Q–10 is now positive 10 volts. This voltage drop provides an effective fast-acting, restoring condition in the circuit when the temperature is decreased as explained hereinafter.

Suppose that the temperature has now decreased a small amount. With only ten volts at the emitter lead of transistor Q–10, the $I_{CBO}$ that was caused by the temperature increase will now decrease very rapidly. This is because there is less forward bias with 10 volts instead of 12 volts at the emitter of transistor Q–10. Also, the decrease of current flow in the emitter-collector circuit of transistor Q–10 will cause the base lead transistor Q–16 to become less positive, and the transistor Q–16 is driven toward cut-off. This reduces the negative voltage fed back through resistor 24 to the base lead of transistor Q–10. The voltage drop across resistor 14 decreases extending a higher positive voltage to the base lead of transistor Q–10 through resistor 26. Thus, transistor Q–10 is driven toward cut-off and less positive voltage is fed to the base lead of transistor Q–16. This chain of events continues until the device is restored to the off condition with 12 volts again present at the emitter and base leads of transistor Q–10, and the collector lead of transistor Q–16.

The resistance value of variable resistor 20 is selected in accordance with the intended function of the temperature actuated device. The temperature is indicated on the dial card 38 and selected with the knob 34 and pointer 36 attached to the shaft of the variable resistor 20. A reverse log type of control is utilized so as to compensate for the non-linearity of the temperature curve, and display a linear temperature indication on the dial card 38 as shown in FIGURE 3.

Sensing transistor Q–16 may be installed outside when the device is used to control a living space furnace. The transistor Q–16 is less sensitive than transistor Q–10, and the outside temperature can be monitored by transistor Q–16 to automatically compensate the temperature control for the change of temperature taking place outdoors.

The temperature range can be extended and the sensivity further increased with the construction shown in FIGURE 2 of the drawings. In this embodiment a variable resistor 40, a diode 42, and a gang control 44 have been added. Assume that dial knob 34 (FIGURE 3) is rotated to its full clockwise position. The resistance of variable resistor 20 is at its lowest value, and the resistance of variable resistor 40 is at its maximum value. Transistor Q–16 is cut off due to the negative voltage extended to its base lead via variable resistor 20 and limiting resistor 18. The ambient temperature existing at transistors Q–10 and Q–16 must now be raised a considerable amount (depending upon the resistance value of variable resistor 40) to again extend a less negative voltage to the base lead of transistor Q–16 and bias the temperature actuated device into conduction.

Sensitivity of the device is increased from conduction to cut-off by use of diode 42 in the positive feedback circuit. The cathode is connected to the collector lead of transistor Q–16, and the anode is connected to the base lead of transistor Q–10 through feedback resistor 24. The same conditions exist when the device is being driven into conduction as described for the embodiment of FIGURE 1. The diode 42 is forward biased and the collector lead of transistor Q–16 sees only the resistance of feedback resistor 24. When the device restores from conduction to cut-off, the diode 42 is reverse biased and the base lead of transistor Q–10 sees a high resistance in the diode, thus allowing a higher positive biasing voltage at the base lead of transistor Q–10.

The configuration of transistor Q–10 and Q–16 can be reversed. In this instance the polarity of the voltage sources and polarity sensitive components is reversed.

An example of suitable component values for use with a twelve volt source as shown in the drawings is as follows:

| | | |
|---|---|---|
| Resistor **14** | ohms | 220–270 |
| Resistor **18** | do | 120–220 |
| Resistor **24** | megohms | 2.7–5.6 |
| Resistor **26** | ohms | 39,000–82,000 |
| Capacitor **28** | microfarads | 5–50 |
| Variable resistor **20** | ohms | 5,000–100,000 |
| Variable resistor **40** | do | 5,000–25,000 |

Having thus described my invention, I claim:

1. A solid state control circuit employing the temperature sensitive characteristics of transistors to activate a control, comprising:

a first temperature sensing transistor so connected into the circuit as to fully utilize its temperature sensitive resistance characteristics;

a second temperature sensing transistor having opposite conductivity connected to the output of said first temperature sensing transistor so as to utilize its temperature sensitive resistance characteristics, and adapted for connection to a load; and a variable biasing resistor connected to the output of said first sensing transistor and the input of said second sensing transistor to establish an operating temperature level.

2. A control circuit according to claim 1 wherein a positive feedback loop extends between the output of said second sensing transistor and the input of said first sensing transistor, and a diode is positioned in said loop.

3. A solid state temperature sensing and control circuit having a conducting and a non-conducting condition, comprising:

a combination sensing and bias offset transistor connected so as to utilize the temperature sensitive characteristics of said transistor;

a combination sensing and output transistor of opposite conductivity connected to the output of said combination sensing and bias offset transistor, and adapted for connection to a load;

a variable biasing resistor connected to the output of said combination sensing and bias offset transistor to establish the operating level; and a circuit sensitizing resistor connected into the entire circuit configuration so as to provide increased sensitivity when the output transistor is switched into the conducting or the non-conducting state.

4. A solid state temperature sensing and control circuit according to claim 3 wherein a positive feedback loop extends between the collector lead of said combination sensing and output transistor and the base lead of said combination sensing and bias offset transistor, and a diode is positioned in said feedback loop, said feedback loop causing regeneration to oscillate the circuit into conduction.

5. A sensitive transistorized temperature controlled circuit having a conducting and a non-conducting condition, comprising:

a first combination temperature sensing and bias offset transistor connected into the circuit so as to fully utilize its temperature sensitive characteristics to offset the biasing conditions of a second combination temperature sensing and output transistor;

a second combination temperature sensing and output transistor of opposite polarity connected to the output of said first combination temperature sensing and bias offset transistor with circuit configuration fashioned to amplify the output of said first temperature sensing and bias offset transistor and feed a portion of its output back to the input of said first combination temperature sensing and bias offset transistor, and adapted for connection to a load;

a variable resistor connected to the output of said first combination temperature sensing and bias offset transistor and to the input of said second combination temperature sensing and output transistor to establish a controlled temperature level; and a circuit sensitizing resistor connected into the total circuit configuration for providing a high sensitivity in the temperature controlled circuit.

6. A sensitive transistorized temperature controlled circuit in accordance with claim 5 wherein a positive feedback loop extends between the collector lead of said combination temperature sensing and output transistor and the base lead of said combination temperature sensing and bias offset transistor; and a diode is positioned in said loop;

said loop causing regeneration to oscillate the circuit into conduction.

7. A solid state temperature actuated control circuit, including:

a first combination temperature sensing and bias offset transistor having emitter, base and collector leads connected into circuitry configuration so as to utilize its temperature sensitive characteristics;

a second combination temperature sensing and output transistor of opposite conductivity to that of said first combination temperature sensing and bias offset transistor, having an emitter, base and collector leads, with the collector lead of said first sensing and bias offset transistor connected to the base lead of said second combination sensing and output transistor;

a first voltage source connected through resistors to the emitter lead and base lead of said first combination temperature sensing and bias offset transistor, and also adapted for connection through a load to the the collector lead of said second combination temperature sensing and output transistor;

the collector lead of said second combination temperature sensing and output transistor connected to the base lead of said first combination temperature sensing and bias offset transistor through a resistor and diode combination feedback loop and adapted for connection to a load;

and a second voltage source of opposite polarity to said first voltage source connected to the emitter lead of said second combination temperature sensing and output transistor, and through a fixed and a variable resistance connected in series, and to the base lead of said combination temperature sensing and bias offset transistor;

whereby small changes in ambient temperature in the vicinity of said first combinaiton temperature sensing and bias offset transistor and said second combination temperature sensing and output transistor are utilized to affect the temperature sensitive resistance characteristics of said first and second sensing transistors and attendant circuitry to operate a load.

8. A solid state temperature actuated control circuit in accordance with claim 7, having a conducting and a non-conducting condition and wherein circuit sensitizing means is provided between the first voltage source and the circuit components for increasing overall sensitivity when the circuit is changing from a conducting to a non-conducting state or from a non-conducting to a conducting state.

References Cited

UNITED STATES PATENTS

| | | | |
|---|---|---|---|
| 2,871,376 | 1/1959 | Kretzmer | 307—310 |
| 3,067,340 | 12/1962 | Hodges | 307—310 X |
| 3,211,989 | 10/1965 | Mintz et al. | 307—310 X |
| 3,364,391 | 1/1968 | Jensen | 317—33 |

ARTHUR GAUSS, *Primary Examiner.*

DONALD D. FORRER, *Assistant Examiner.*

U.S. Cl. X.R.

307—313; 317—132, 33, 40, 148.5